United States Patent
Carr et al.

(10) Patent No.: US 7,639,837 B2
(45) Date of Patent: *Dec. 29, 2009

(54) IDENTIFICATION DOCUMENTS AND AUTHENTICATION OF SUCH DOCUMENTS

(75) Inventors: J. Scott Carr, Carlisle, MA (US); Burt W. Perry, Portland, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/626,150

(22) Filed: Jan. 23, 2007

(65) Prior Publication Data

US 2007/0114788 A1  May 24, 2007

Related U.S. Application Data

(63) Continuation of application No. 11/286,154, filed on Nov. 23, 2005, now Pat. No. 7,269,275, which is a continuation of application No. 10/011,129, filed on Nov. 9, 2001, now Pat. No. 6,970,573, which is a continuation of application No. 09/442,780, filed on Nov. 18, 1999, now Pat. No. 6,389,151, which is a continuation-in-part of application No. 09/074,034, filed on May 6, 1998, now Pat. No. 6,449,377, said application No. 10/011,129 is a continuation-in-part of application No. 09/198,022, filed on Nov. 23, 1998, now Pat. No. 6,546,112, which is a continuation of application No. 08/763,847, filed on Dec. 4, 1996, now Pat. No. 5,841,886, which is a continuation of application No. 08/512,993, filed on Aug. 9, 1995, now abandoned.

(60) Provisional application No. 60/109,259, filed on Nov. 19, 1998.

(51) Int. Cl.
*H04K 1/00* (2006.01)

(52) U.S. Cl. .................................. 382/100; 340/5.86

(58) Field of Classification Search ................. 382/100, 382/115, 135; 713/176; 340/5.86; 380/277, 380/44, 54

See application file for complete search history.

(56) References Cited

U.S. PATENT DOCUMENTS 4,590,366 A   5/1986   Rothfjell ...................... 235/494

(Continued)

FOREIGN PATENT DOCUMENTS

DE   29 43 436 A1   5/1981

(Continued)

OTHER PUBLICATIONS

U.S. Appl. No. 60/109,259, filed Nov. 19, 1998, Carr et al.

(Continued)

*Primary Examiner*—Andrew W Johns

(57) ABSTRACT

The present invention relates generally to identification documents. In one implementation, a provided method includes: obtaining optical scan data associated with text characters provided on an identification document to obtain first data; using at least a portion of the first data to facilitate decryption of information—not the text characters—carried on or in the identification document. The information corresponds to the identification document or to an authorized bearer of the identification document. In another implementation, a method is providing including: obtaining optical scan data associated with an identification document to obtain first data; obtaining second data from the identification document, the second data comprising encrypted data; communicating the encrypted data and the first data to a remote device, the remote device decrypting the encrypted data with at least reference to the first data; and receiving decrypted data from the remote device. Other implementations and embodiments are provided as well.

19 Claims, 3 Drawing Sheets

U.S. PATENT DOCUMENTS

| | | | |
|---|---|---|---|
| 4,675,746 A | 6/1987 | Tetrick et al. | 358/296 |
| 4,689,477 A | 8/1987 | Goldman | 235/380 |
| 4,790,566 A | 12/1988 | Boissier et al. | 283/91 |
| 4,837,422 A | 6/1989 | Dethloff et al. | 235/380 |
| 4,972,476 A | 11/1990 | Nathans | 380/23 |
| 5,237,164 A | 8/1993 | Takada | 235/487 |
| 5,284,364 A | 2/1994 | Jain | 283/87 |
| 5,319,453 A | 6/1994 | Copriviza et al. | 348/6 |
| 5,337,361 A | 8/1994 | Wang et al. | 380/51 |
| 5,351,302 A | 9/1994 | Leighton et al. | 380/30 |
| 5,379,344 A | 1/1995 | Larsson et al. | 380/23 |
| 5,379,345 A | 1/1995 | Greenberg | 380/23 |
| 5,384,846 A | 1/1995 | Berson et al. | 380/23 |
| 5,436,970 A | 7/1995 | Ray et al. | 380/23 |
| 5,469,506 A | 11/1995 | Berson et al. | 380/23 |
| 5,471,533 A | 11/1995 | Wang et al. | 380/51 |
| 5,490,217 A | 2/1996 | Wang et al. | 380/51 |
| 5,499,293 A | 3/1996 | Behram et al. | 380/4 |
| 5,499,294 A | 3/1996 | Friedman | 380/10 |
| 5,636,292 A | 6/1997 | Rhoads | 382/232 |
| 5,646,997 A | 7/1997 | Barton | 380/23 |
| 5,652,626 A | 7/1997 | Kawakami et al. | 348/463 |
| 5,659,726 A | 8/1997 | Sandford, II et al. | 395/612 |
| 5,664,018 A | 9/1997 | Leighton | 380/54 |
| 5,694,471 A | 12/1997 | Chen et al. | 380/25 |
| 5,719,948 A | 2/1998 | Liang | 382/112 |
| 5,721,788 A | 2/1998 | Powell et al. | 382/100 |
| 5,740,244 A | 4/1998 | Indeck et al. | 380/4 |
| 5,748,783 A | 5/1998 | Rhoads | 382/232 |
| 5,760,386 A | 6/1998 | Ward | 235/493 |
| 5,768,426 A | 6/1998 | Rhoads | 382/232 |
| 5,787,186 A | 7/1998 | Schroeder | 382/115 |
| 5,790,662 A | 8/1998 | Valerij et al. | 380/2 |
| 5,799,092 A | 8/1998 | Kristol et al. | 380/51 |
| 5,822,432 A | 10/1998 | Moskowitz et al. | 380/28 |
| 5,825,892 A | 10/1998 | Braudaway et al. | 380/51 |
| 5,838,814 A | 11/1998 | Moore | 382/115 |
| 5,841,886 A | 11/1998 | Rhoads | 382/115 |
| 5,862,218 A | 1/1999 | Steinberg | 380/10 |
| 5,864,622 A | 1/1999 | Marcus | 380/23 |
| 5,864,623 A | 1/1999 | Messina et al. | 380/23 |
| 5,890,742 A | 4/1999 | Waller | 283/67 |
| 5,907,149 A | 5/1999 | Marckini | 235/487 |
| 5,912,974 A | 6/1999 | Holloway et al. | 380/51 |
| 5,949,885 A | 9/1999 | Leighton | 380/54 |
| 5,951,055 A | 9/1999 | Mowry, Jr. | 283/93 |
| 5,984,366 A | 11/1999 | Priddy | 283/72 |
| 5,995,625 A | 11/1999 | Sudia et al. | 380/25 |
| 6,024,287 A | 2/2000 | Takai et al. | 235/493 |
| 6,040,783 A | 3/2000 | Houvener et al. | 340/825.3 |
| 6,064,764 A | 5/2000 | Bhaskaran et al. | 382/183 |
| 6,086,707 A | 7/2000 | Waller | 156/277 |
| 6,104,812 A | 8/2000 | Koltai et al. | 380/51 |
| 6,122,403 A | 9/2000 | Rhoads | 382/100 |
| 6,154,571 A | 11/2000 | Cox et al. | 382/250 |
| 6,185,312 B1 | 2/2001 | Nakamura et al. | 382/100 |
| 6,185,316 B1 | 2/2001 | Buffam | 382/115 |
| 6,229,924 B1 | 5/2001 | Rhoads et al. | 382/232 |
| 6,243,480 B1 | 6/2001 | Zhao et al. | 382/100 |
| 6,268,058 B1 | 7/2001 | Tahon et al. | 428/426 |
| 6,285,776 B1 | 9/2001 | Rhoads | 382/100 |
| 6,289,108 B1 | 9/2001 | Rhoads | 382/100 |
| 6,292,092 B1 | 9/2001 | Chow et al. | 340/5.6 |
| 6,321,981 B1 | 11/2001 | Ray et al. | 235/380 |
| 6,343,138 B1 | 1/2002 | Rhoads | 382/100 |
| 6,369,904 B1 | 4/2002 | Bhattacharjya et al. | 358/1.14 |
| 6,389,151 B1 | 5/2002 | Carr et al. | 382/100 |
| 6,411,392 B1 | 6/2002 | Bender et al. | 358/1.14 |
| 6,449,377 B1 | 9/2002 | Rhoads | 382/100 |
| 6,463,416 B1 | 10/2002 | Messina | 705/1 |
| 6,496,933 B1 | 12/2002 | Nunally | 713/176 |
| 6,522,770 B1 | 2/2003 | Seder et al. | 382/100 |
| 6,546,112 B1 | 4/2003 | Rhoads | 382/100 |
| 6,674,886 B2 | 1/2004 | Davis et al. | 382/135 |
| 6,751,336 B2 | 6/2004 | Zhao | 382/100 |
| 6,788,800 B1 | 9/2004 | Carr et al. | 382/100 |
| 6,970,573 B2 | 11/2005 | Carr et al. | 382/100 |
| 7,043,052 B2 | 5/2006 | Rhoads | 382/100 |
| 7,269,275 B2 | 9/2007 | Carr et al. | 382/100 |
| 2001/0007975 A1 | 7/2001 | Nyberg, Jr. et al. | 705/1 |
| 2004/0181671 A1 | 9/2004 | Brundage et al. | 713/176 |

FOREIGN PATENT DOCUMENTS

| | | |
|---|---|---|
| EP | 0629972 A2 | 12/1994 |
| EP | 0650146 A1 | 4/1995 |
| EP | 0730 242 A2 | 9/1996 |
| EP | 0642 060 B1 | 4/1999 |
| JP | 3-185585 A | 8/1991 |
| WO | WO 95/13597 A2 | 5/1995 |
| WO | WO 96/03286 A1 | 2/1996 |
| WO | WO 96/26494 A1 | 8/1996 |
| WO | WO 96/36163 A2 | 11/1996 |
| WO | WO98/43152 A1 | 10/1998 |
| WO | WO 99/36876 A2 | 7/1999 |

OTHER PUBLICATIONS

U.S. Appl. No. 08/512,993, filed Aug. 9, 1995, Rhoads.

Office Action (Oct. 4, 2004) and Amendment (Jun. 14, 2004) from U.S. Appl. No. 10/164,899.

Anand, D. and Niranjan V.C. "Watermarking Medical Images with Patient Information" IEEE, Oct. 29, 1998.

Bleumer, "Biometric yet Privacy Protecting Person Authentication," Proc. 2.sup.nd Information Hiding Workshop, LNCS vol. 1525, Apr. 1998, pp. 99-110.

Chow et al. "Forgery and Tamper-Proof Identification Document" IEEE Proc. 1993 Int. Carnahan Conf. on Security Technology Oct. 13-15, 1993, pp. 11-14.

Gruhl et al., "Information Hiding to Foil the Casual Counterfeiter," Proc. 2.sup.nd Information Hiding Workshop, LNCS vol. 1525, Apr. 1998, pp. 1-15.

Kawaguchi et al. "Principle and Applications of BPCS-Steganography" Proc. SPIE vol. 3528: Multimedia Systems and Applications Nov. 2-4 1998 pp. 464-473.

Komatsu et al. "A Proposal on Digital Watermarking in Document Image Communication and Its Application to Realizing a Signature" Electronics and Communications in Japan Part I vol. 73 No. 5 1990 pp. 22-23.

Komatsu et al. "Authentication System Using Concealed Image in Telematics" Memoirs of the School of Science & Engineering Waseda Univ. No. 52 1988 pp. 45-60.

Pankanti, S. et al. "Verification Watermarks on Finger print Recognition and Retrieval" IS&T/SPIE Conference on Security and Watermarking on Multimmedia: Oct. 2000, pp. 66-78.

Perry, B.et al :Digital Watermarks as a Security Feature for Identity Documents Proceedings of SPIE, vol. 3973, Apr. 2000 pp. 80-87.

Ratha, N. et al. "Secure Data hiding in Wavelet Compressed Fingerprint Images" ACM Multimedia 2000 Workshop Oct. 30, 2000 pp. 127-130.

Seybold Report on desktop Publishing "Holographic Signatures for Digital Images" Aug. 1995 1 page.

Szepanski, "A Signal Theoretic Method For Creating Forgery-Proof Documents For Automatic Verification", 1979 Carnahan Conference on Crime Countermeasures, University of Kentucky, Lexington, Kentucky, May 16-18, 1979.

Jul. 28. 2008 Notice of Appeal; and Apr. 14, 2008 Notice of Abandonment; all-from assignee's U.S. Appl. No. 10/686,495 (published as US 2004-0181671 A1).

Feb. 28, 2008 final Office Action (including Examiner Interview Summary); Feb. 8, 2008 Supplemental Response; all from assignee's U.S. Appl. No. 10/686,495 (published as US 2004-0181671 A1).

Nov. 19, 2007 Amendment: and May 18, 2007 non-final Office Action; all from assignee's U.S. Appl. No. 10/686,495 (published as US 2004-0181671 A1).

Mar. 1, 2007 Pre-Brief Appeal Conference decision: Feb. 9, 2007 final Office Action; Jan. 10, 2007 Amendment: and Jan. 8, 2007 Office Action; all from assignees U.S. Appl. No. 10/686,495 (published as US 2004-0181671 A1).

Eric Kleefeld, "Passports to contain RFID chips next year: Government says it's "more secure"; ACLU raises privacy concerns," Wisconsin Technology Network, published at http://wistechnology.com/article.php?id=2444 (published on Nov. 2, 2005; submitted sheets printed from the internet on Mar. 23, 2006), 3 pages.

IDENTIFICATION DOCUMENTS AND AUTHENTICATION OF SUCH DOCUMENTS

RELATED APPLICATIONS

This application is a continuation of U.S. patent application Ser. No. 11/286,154, filed Nov. 23, 2005 (now U.S. Pat. No. 7,269,275), which is a continuation of application Ser. No. 10/011,129 filed Nov. 9, 2001, (now U.S. Pat. No. 6,970,573), which are each hereby incorporated by reference. The Ser. No. 10/011,129 application is a continuation of U.S. patent application Ser. No. 09/442,780, filed Nov. 18, 1999 (now U.S. Pat. No. 6,389,151), which claims the benefit of U.S. Provisional Patent Application No. 60/109,259, filed Nov. 19, 1998. The Ser. No. 09/442,780 application is also a continuation in part of U.S. patent application Ser. No. 09/074,034, filed May 6, 1998 (now U.S. Pat. No. 6,449,377). The Ser. No. 10/011,129 application is also a continuation in part of U.S. patent application Ser. No. 09/198,022, filed Nov. 23, 1998 (now U.S. Pat. No. 6,546,112), which is a continuation of U.S. patent application Ser. No. 08/763,847, filed Dec. 4, 1996 (now U.S. Pat. No. 5,841,886), which is a continuation of U.S. patent application Ser. No. 08/512,993, filed Aug. 9, 1995 (now abandoned).

FIELD OF THE INVENTION

The present invention relates to the security documents such as passports, driver's licenses, credit cards, etc. and to systems for producing and validating such documents.

BACKGROUND OF THE INVENTION

Many security documents contain a picture of the owner of the document. For example, a driver's license generally includes a picture of the driver and a passport generally includes a picture of the owner of the passport. Validation of such documents is performed by comparing the actual physical appearance of the person possessing the document to the picture on the document. A common counterfeiting technique involves replacing the picture on a security document with a picture of someone who is not the owner of the document.

U.S. Pat. No. 5,841,886 which will issue Nov. 24, 1998 describes a technique whereby a digital watermark is included in the picture on a security document. The security document contains human readable text that is related to the data contained in the watermark. The document can be inserted into a scanner which will read the watermark and the operator can compare the output of watermark reader to the text to insure that the person possessing the document is the legitimate owner.

Custom printing systems are available which accept data from multiple sources and which produce documents which are tailored to individual customer characteristics or to information concerning an individual customer. Such systems can for example produce personalized documents that include both fixed information that is on each document that is printed and variable information such as personal information about an individual's account at an institution such as a bank. One such system is commercially marketed under the trademark "PageFlex" by Bitstream Inc. or Cambridge Mass.

Likewise the technology for producing images which contain steganographic information in the form of digital watermarks is well developed. For example see U.S. Pat. No. 5,636,292, U.S. Pat. No. 5,748,783 or the "Communications of the ACM" published Jul. 1998 Vol. 41. No. 7 pages 31 to 77. Commercial products which can store and read digital watermarks are also widely available. Examples of such products include "Adobe PhotoShop" Versions 4.0 and 5.0 and "Adobe ImageReady" Version 1.0 which are marketed by Adobe Corporation, "CorelDRAW" Versions 7 and 8, and "Corel PHOTO-PAINT" Versions 7 and 8 which are marketed by Corel Corporation, and Micrografx Webtricity" Versions 1 and 2, "Micrografx Graphics Suite 2", and "Micrografx Picture Publisher" Versions 7 and 8 which are marketed by Micrografx Corporation.

Security documents such as passports and drivers licenses have traditionally contained both images and printed text. However, the images and the text in such documents are generally prepared in separate processes and merely merged at a final step in the overall production.

The present invention is directed to an improved security document which has several correlated multi-level self validating features. The present invention is also directed to an improved overall method and system for producing security documents and to automatic authentication systems for such documents. With the present invention the document contains a number of different kinds of information that is hidden from normal view and which can be correlated to validate the document. The validation can be done entirely automatically decreasing the need for human intervention.

With the prior art systems, a human being such as an immigration officer must examine a passport to determine if the person presenting the document is the rightful owner of the document. With the present invention, the authentication can be done entirely automatically, leaving the human operator free to handle non-routine situations.

SUMMARY OF THE INVENTION

The present invention provides security documents which has multiple fields or areas each of which contains information that is perceptible in more than one way. For example, one field can contain a visually perceptible image and a digital watermark that can be detected when the image is scanned and processed, another field can contain machine readable OCR text that can be read by both a human and by a programmed computer, and still another field can contain watermark data which can be correlated to the output of a fingerprint reader or apparatus which scans a user's iris.

Documents in accordance with the present invention are produced by a system and method which begins with a template which defines the placements of elements on the document and the interrelationships between hidden and visual information on the document. That is, the template specifies the placement of elements such as images, photographs, and text and it also specifies the interrelationship between information that is visually perceptible to a user of the document and information that is hidden (not perceptible to a user) by means of digital watermarks. Different hidden digital watermark data is included in multiple elements of the document. The watermarks in the different graphic elements of the document are correlated to each other and correlated to the visual material on the document. In this way the document can not be forged by replacing one element (such as a picture) with a similar element from another document. In order to produce a document defined by a particular template, appropriate pictures, graphics and digital data are extracted from a data bank, and watermark data is embedded in the pictures and graphics as appropriate. The merged digital data is then sent to a printing engine and the final document is produced.

An automatic validation system of the present invention reads multiple fields on the document, and it also automatically detects information about the user. The various information is correlated to validate the document.

DESCRIPTION OF A PREFERRED EMBODIMENT

Figure 1:
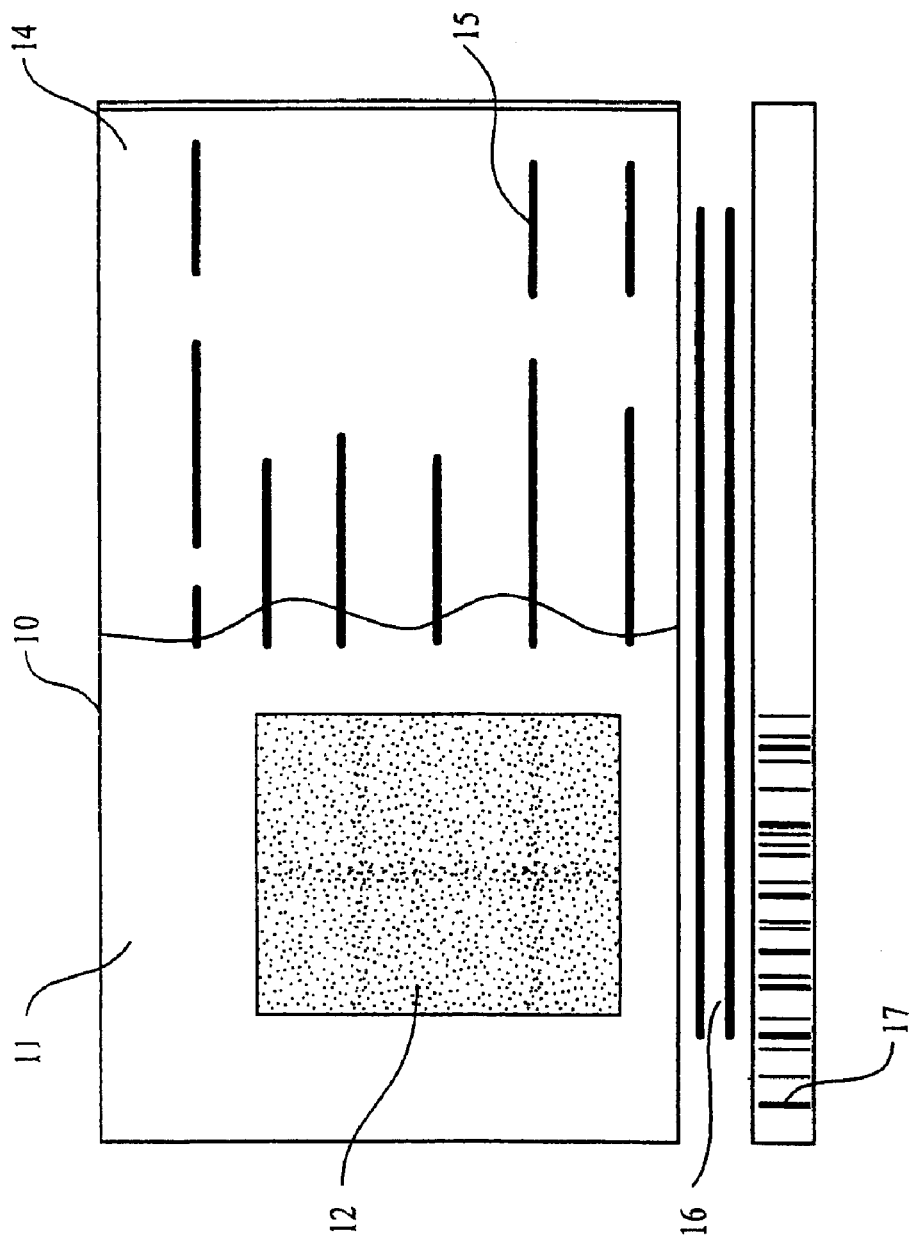
FIG. 1 illustrates a security document in accordance with the present invention.

A diagram of a security document in accordance with the present invention is shown in FIG. 1. The security features on the document are a pre-printed background 11 which has an image or pattern (not visible in FIG. 1) which contains a digital watermark. The image in background 11 may contains lines the width of which are varied to carry a watermark in accordance with the technique described in co-pending application Ser. No. 09/074,034 filed May 6, 1998 (now U.S. Pat. No. 6,449,377), the disclosure of which in incorporated herein in its entirety.

The document also contains a photograph 12 which shows the owner of the document. This photograph 12 contains a watermark such as that described in U.S. Pat. No. 5,841,886 which will issue Nov. 24, 1998. The personalized background 14 can for example be a background image which corresponds to the image 12. While the personalized image 14 corresponds to the photograph 12, in area 14 the image is printed as a background image. Background images of various types are conventional, for example personal checks frequently have background images of animals, mountains, etc. The background text makes it hard to change the human readable text 15 which is printed over the background text. The bottom of the document has machine readable OCR-B text 16 and a Bar code 17.

It should be clearly understood that the document shown in FIG. 1 is merely illustrative of the various elements that can be combined to form a security document. The exact layout can vary depending upon the needs of the particular application. If desired for a particular application, the document can be much more complex than the document shown in FIG. 1. The document can have many more fields and elements than does the document shown in FIG. 1. Furthermore the document could contain the various other known technology for preventing counterfeiting such as special paper and special ink.

Document shown in FIG. 1 can for example be a document such as a driver's license in which case the picture 12 would be a picture of the owner of the license. Graphic image 11 could for example be a state seal. The text 15 could for example include the driver's license number, the owner's age, and the owner's address.

Document 10 can be a passport. In a passport, the hidden digital watermark data in picture 12 and in the other fields could be coordinated as follows:

| | Watermark contains | Correlates to |
|---|---|---|
| Pre-printed background 11 | unique document "batch" number | |
| Photo 12: | Batch number and passport number (cryptographically encoded) | OCR-B version of passport number, Human readable passport number, Master document |
| Personalized background 14 | "hash" of fingerprint | fingerprint of the holder which is automatically read |
| Bar code 17 | Passport number (in code not in watermark) | Watermark in photo 12 |
| OCR-B text 16 | Passport number Batch number (in text not in watermark) | Info in photo 12, background 11 And Bar code 17 |

An important point is that the various elements of hidden and visual information are coordinated in such a manner that the document is self authenticating. The hidden data in one field can be correlated with the hidden data in another field to insure that the document has not been altered.

If for example one tried to alter a document by replacing picture 12 with a different picture, the new picture would either contain no hidden data, or if it were a picture taken from a different document, the numbers stored in the picture would not match the printed information in text field 15.

If the picture from one document were substituted for the picture in a second document, the cryptographically encoded serial numbers could be used to determine the origin of the picture. It is noted that while in the example shown above, both the Batch number and passport number are cryptographically encoded, other numbers such as a serial number or an ID number could also be encoded in a special manner.

Figure 2:
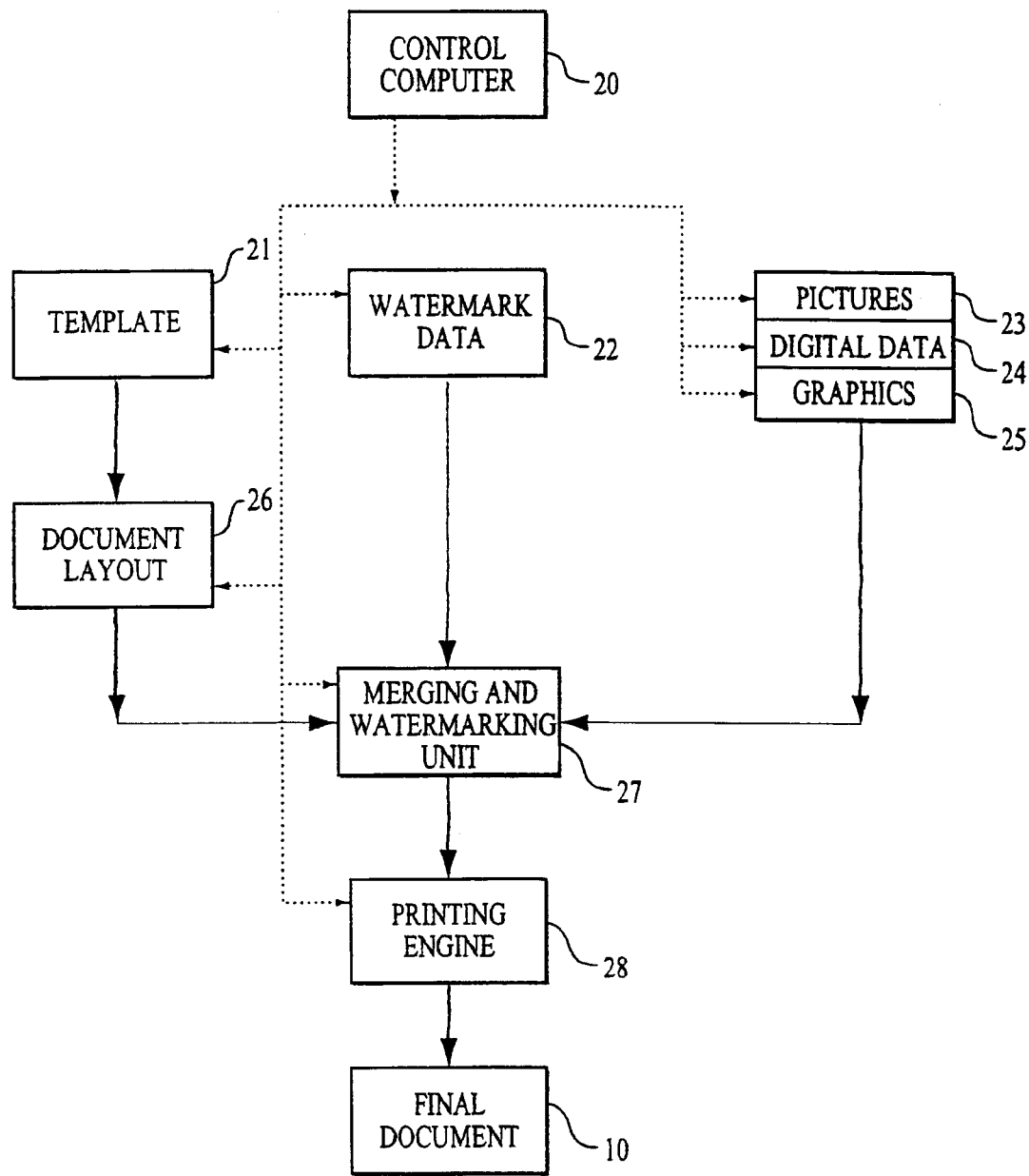
FIG. 2 is an overall diagram of a preferred embodiment of a system to produce security documents in accordance with the present invention.

FIG. 2 shows an overall diagram of a system for producing document 10. The system includes a number of units, the operation of which is controlled and coordinated by a control computer 20. The following explanation will illustrate how the embodiment shown in FIG. 2 can be used to produce a document such as the document shown in FIG. 1.

A template 21 is used to define the overall characteristics of a document. The characteristics specified by template 21, including the fields on the document, the data printed in any text fields and the watermarks included in each image included on the document.

The template 21 is used by document layout device 26 to layout a particular document for production. Data which is to be included in the watermarks in any image field are stored in Watermark data store 22. Any pictures, text data, and Graphics are stored in units 23, 24 and 25 respectively.

The document layout from unit 26, the digital watermark data from unit 22 and the pictures, text data and graphics from units 23, 24, and 25 are sent to Merging and watermarking unit 27. Unit 27 applies watermarks to pictures and graphics as specified by the layout information from unit 11. Application of the watermarks to the pictures and graphics can be done in a conventional manner; however, prior to sending the watermark payload (i.e. the data stored in the watermark) to the watermarking engine, the data can be passed through a conventional encryption program. Encrypting the payload data provides an added assurance that a counterfeiter could not make a counterfeit document. The level of encryption could be any level appropriate to the value of the document.

The output from the Merging and watermarking unit 27 is then sent to a conventional printing engine 28 which produces a final document 10.

Watermark Data storage 22, picture storage 23, digital data storage 24 and graphics storage 25 can be conventional data storage servers. Physically they could all be provided by one physical storage unit. Template input unit 21 is a conventional interactive terminal or personal computer with a graphic design program. Merging and watermarking unit 27 can be a conventional watermarking engine.

The system shown in FIG. 2 produces various parts of the security document in a single step, thereby making it much harder to replace one element on a security document with a similar element from another document.

Figure 3:
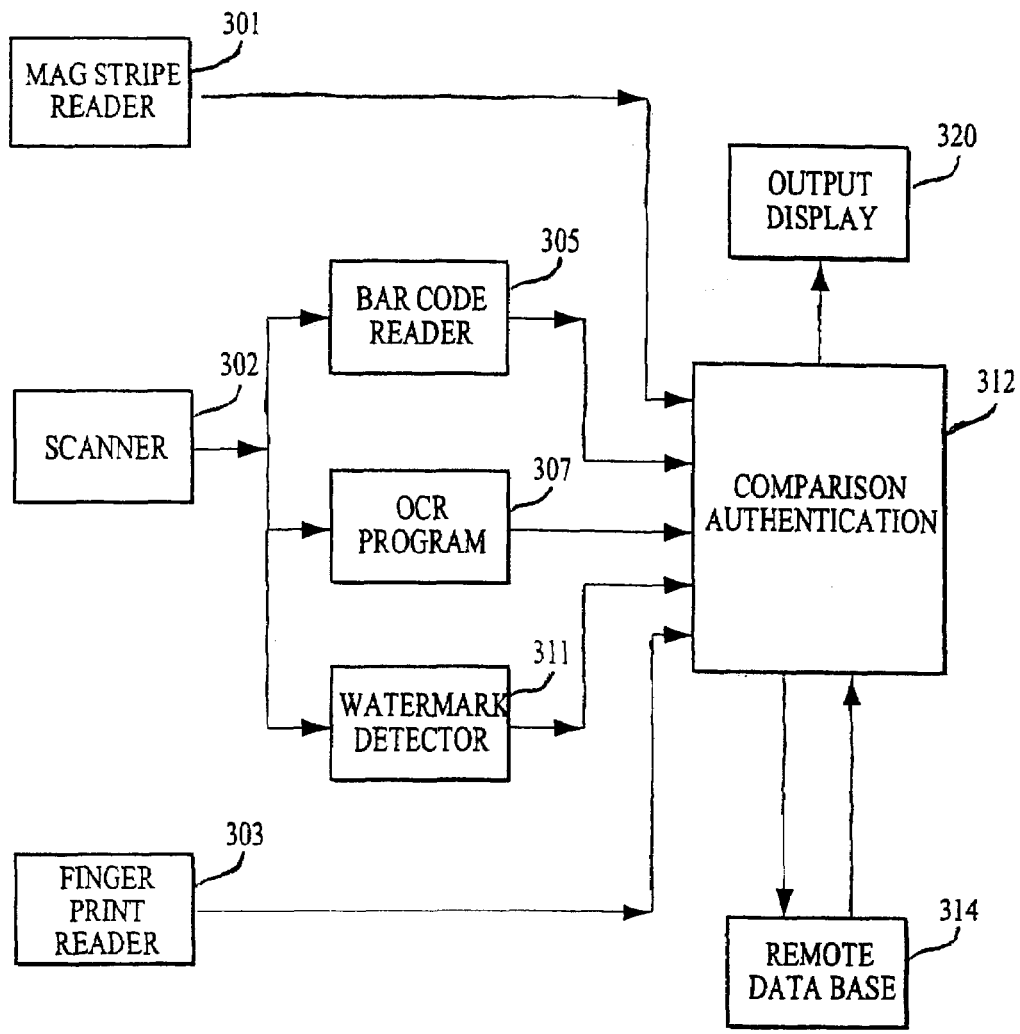
FIG. 3 is a diagram of a document validation system that operates in accordance with the present invention.

FIG. 3 is a diagram of a document self authentication unit in accordance with the present invention. The system has three input units, each of which is conventional and commercially available. The input units are a magnetic stripe reader 301, a high resolution image scanner 302, and a fingerprint reader 303. The document 10, shown in FIG. 1 does not include a magnetic stripe, but one of the alternatives for such a document is to include a magnetic stripe.

The output from scanner 302 goes to three units (that is, to three computer programs) 305, 307 and 311. Alternatively, the bar code reader 305 could be a separate unit which directly reads the bar code and provides information to comparison and authentication unit 312.

If the bar code reader 305 is a computer program which receives information from the output of scanner 302, the program 305 will read the bar code 17. OCR program 307 reads the text 15 and the text 16 and watermark detector 311 reads the watermarks in images 11, 12 and 14.

An authentication and comparison unit 312 compares the data from units 301, 303, 305, 307 and 311 to determine if the data matches. If the data in some of the watermarks is encrypted, the comparison and authentication unit 312 would include an appropriate decryption program. The decryption program in unit 312 could obtain the decryption key from remote data base 314 in response to the number read by one of the devices. Alternatively, the encrypted data could be automatically sent to a central facility for decryption. The unit 312 can also access a remote data base 314 to determine if there is any special handling that is required for the document that has been presented. For example data base 314 could contain information about passports that have been cancelled for various reasons. The resulting information is displayed on a display unit 320.

What is claimed is:

1. A method comprising:
   obtaining optical scan data associated with text characters provided on an identification document;
   processing the optical scan data to obtain first data; and
   using at least a portion of the first data to facilitate decryption of information—not the text characters—carried on or by the identification document, wherein the information corresponds to the identification document or to an authorized bearer of the identification document, and in which the decryption of information is carried out by a programmed electronic processor.

2. The method of claim 1 wherein the at least a portion of the first data is used to access a decryption key.

3. The method of claim 1 wherein the information is carried by a carrier selected from a group of carriers comprising: a barcode, digital watermark, magnetic stripe, graphic and photograph.

4. The method of claim 1 wherein the information is steganographically hidden on or by the identification document through alterations to data representing a photograph or graphic carried on or by the identification document.

5. A computer readable medium comprising instructions to cause an electronic processor to perform the method of claim 1.

6. The method of claim 1 wherein the at least a portion of the first data comprises a document identifier.

7. A programmed computing device comprising instructions stored in memory, said instructions are executable by said programmed computing device to perform the acts of claim 1.

8. The method of claim 1 in which the identification document comprises a passport.

9. A method comprising:
   obtaining optical scan data associated with an identification document;
   processing the optical scan data to obtain first data;
   obtaining second data from the identification document, the second data comprising encrypted data;
   communicating the encrypted data and the first data to a remote device, the remote device decrypting the encrypted data with at least reference to the first data, the remote device utilizing a programmed electronic processor to decrypt the encrypted data; and
   receiving decrypted data from the remote device.

10. The method of claim 9 wherein the optical scan data corresponds to OCR recognizable characters.

11. The method of claim 9 wherein the first data comprises a number or identifier.

12. The method of claim 9 wherein the second data is carried by digital watermarking.

13. A computer readable medium comprising instructions to cause an electronic processor to perform the method of claim 9.

14. A programmed computing device comprising instructions stored in memory, said instructions are executable by said programmed computing device to perform the acts of claim 9.

15. The method of claim 9 in which the identification document comprises a passport.

16. An apparatus comprising:
   electronic memory for buffering optical scan data associated with text characters provided on an identification document;
   an electronic processor programmed for:
   processing the optical scan data to obtain first data; and
   decrypting information—not the text characters—carried on or by the identification document with reference to the first data, wherein the information corresponds to the identification document or to an authorized bearer of the identification document.

17. The apparatus of claim 16 in which said electronic processor is operating to perform at least one of the functions recited therein.

18. An apparatus comprising:
   electronic memory for buffering optical scan data associated with an identification document;
   an electronic processor programmed for:
   processing the optical scan data to obtain first data;
   communicating the first data and encrypted data to a remote device, the encrypted data having been obtained from the identification document or information carried by the identification document, the remote device decrypting the encrypted data with at least reference to the first data; and
   receiving decrypted data from the remote device.

19. The apparatus of claim 18 in which said electronic processor is operating to perform at least one of the functions recited therein.

* * * * *